March 29, 1966   H. E. FREEMAN   3,242,541
CABLE TENSION ADJUSTING DEVICE
Filed Feb. 27, 1964

INVENTOR.
HOWARD E. FREEMAN
BY
ATTORNEYS

March 29, 1966  H. E. FREEMAN  3,242,541
CABLE TENSION ADJUSTING DEVICE
Filed Feb. 27, 1964  2 Sheets-Sheet 2

INVENTOR.
HOWARD E. FREEMAN
BY
*Wade Knott*
*Sherman H. Goldman*
ATTORNEYS

United States Patent Office 3,242,541
Patented Mar. 29, 1966

3,242,541
CABLE TENSION ADJUSTING DEVICE
Howard E. Freeman, Grand Prairie, Tex., assignor, by mesne assignments, to the United States of America as represented by the Secretary of the Air Force
Filed Feb. 27, 1964, Ser. No. 347,970
4 Claims. (Cl. 24—68)

The invention described herein may be manufactured and used by or for the Government of the United States of America for governmental purposes without the payment of any royalties thereon or therefor.

This invention relates to devices for securing straps or cables in airplanes or on suits worn by occupants thereof and more particularly to devices for adjusting tension on such straps or cables.

Such devices are particularly useful in adjusting tension on, or securing, parts of personnel restraint systems for the protection of astronauts or occupants of high performance aircraft.

Many conventional buckle, strap or cable fasteners are employed for this purpose; but they are sometimes clumsy, insecure, hard to adjust or hard to fasten or unfasten.

Briefly, the device of this invention comprises a barrel with an interrupted thread and a bolt within the barrel with a matching interrupted thread, the said barrel being rotatable in a circular housing. Inside the bolt, which is bored out, is a cable with a swaged ball on it to hold it securely in the bolt. Revolving the barrel 90 degrees in the housing releases the threaded bolt thus freeing the cable.

It is an object of this invention, therefore, to overcome the deficiencies of the prior art by furnishing a strong, secure cable tension device which can be quickly and easily adjusted to put tension on a cable in small increments.

It is another object of this invention to provide a device which can be remotely adjusted and which will provide a positive lock.

It is a further object of this invention to provide such a cable tension adjusting device which can be economically made from easily obtainable materials which lend themselves to standard mass production manufacturing techniques.

Figure 1:
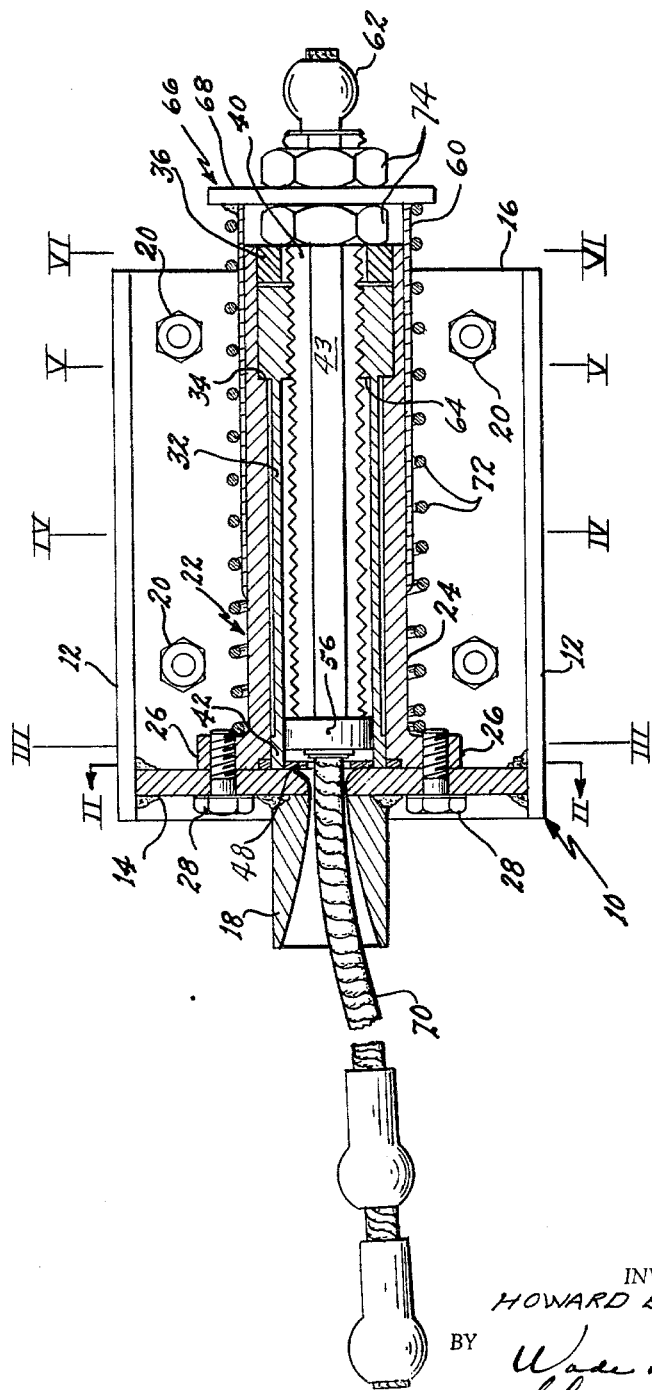
Figure 2:
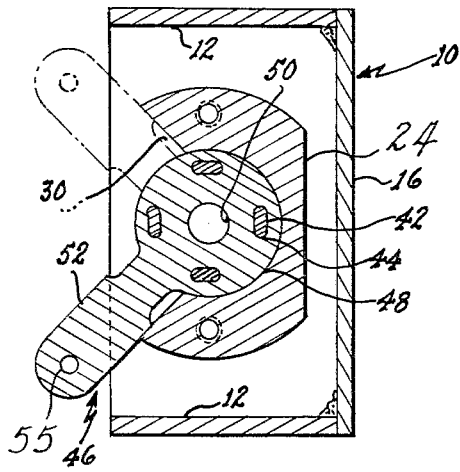
Figure 3:
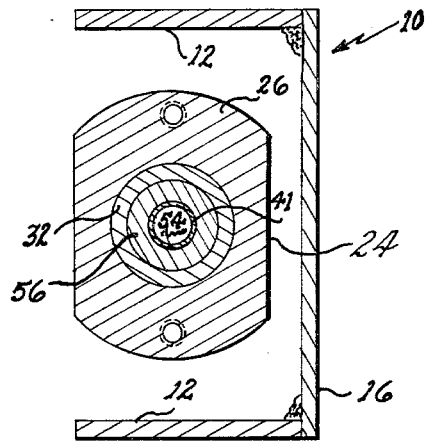
Figure 4:
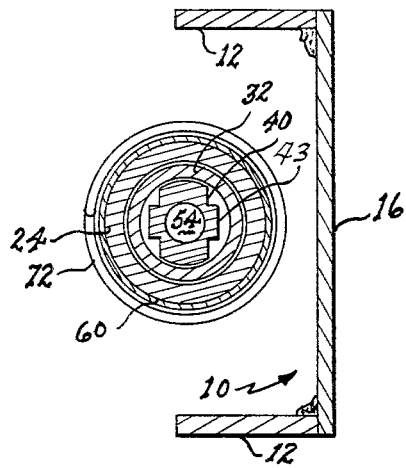
Figure 5:
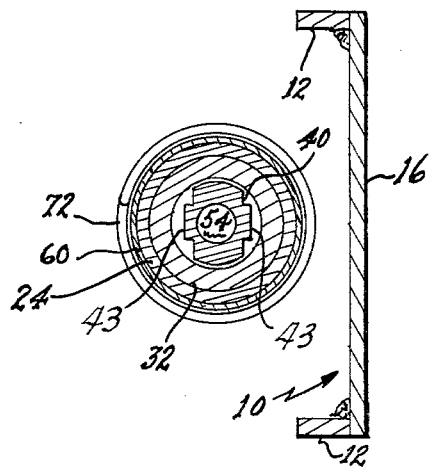
Figure 6:
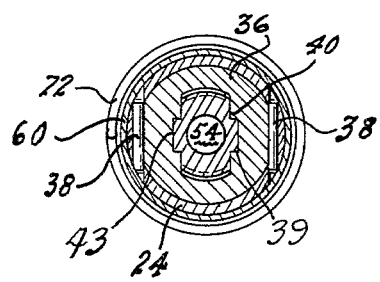

These and other advantages will be apparent upon consideration of the following detailed description, especially when taken in conjunction with the accompanying drawings, in which:

FIGURE 1 is a detailed sectional view of the assembled device;
FIGURE 2 is a cross-section of FIGURE 1 taken along lines II—II;
FIGURE 3 is a cross-section of FIGURE 1 taken along lines III—III;
FIGURE 4 is a cross-section of FIGURE 1 taken along lines IV—IV;
FIGURE 5 is a cross-section of FIGURE 1 taken along lines V—V; and
FIGURE 6 is a cross-section of FIGURE 1 taken along lines VI—VI.

Referring to FIGURE 1, there is shown a bracket assembly 10 which is comprised of a pair of side plates 12 which taper toward one end from a point midway along the length of the side plate, a base plate 16 and an end plate 14, all of which are secured together, for example, by welding. The bracket assembly may be secured to a portion of a space vehicle by means of bolts or other securing means 20 when the device is to be used as a tensioning means for a personnel restraint system. A cable guide 18, generally cylindrical in shape, is secured to the end plate 14 and has an internally stepped tapered bore. Of course, the end plate 14 is suitably bored and flared in order to allow passage of the cable therethrough.

A barrel assembly 22 is secured to the end plate 14 of the bracket assembly 10 by any conventional means, for example, bolts 28 which extend into threaded portions of flange 26 of the barrel housing 24. The barrel housing has a bore therethrough with counterbores at each end. As can best be seen in FIGURE 2, a portion of the barrel housing 24 is cut away for a 90° section at 30 in order to allow for extension of a handle 52 of a handle unit 46 therethrough, its movement being from the solid lined portion of the figure to that shown in phantom. A barrel 32 is mounted within the barrel housing 24 and has an external shoulder portion at 34 which engages the counterbore at the right hand end of the barrel housing as shown in FIGURE 1. A substantially circular guide 36 is mounted within the barrel housing 24 and behind the barrel 32 to maintain it in a fixed longitudinal position. The guide 36 shown most clearly in FIGURE 6 has pins 38 for maintaining it in a fixed position.

The guide 36 is internally bored with female keyways at 39 to allow for passage of a bolt, as will be later described. In effect, the bore through the guide 36 forms an elongated slot with key slots at the sides. The end of the barrel 32, remote from the guide 36, is slotted to form fingers 42 which engage corresponding holes 44 in the handle unit 46 (FIGURE 2). The handle unit 46 comprises a generally circular disk at 48 containing the holes 44, a central bore at 50 in alignment with the hole through the cable guide 18 and the end plate 14 for passageway of the cable therethrough, and a handle portion 52 extending radially from the disk portion. The handle unit 46 is limited in its movement of rotation by means of the cutout portion 30 in the flange 26 of the barrel housing 24. A hole in the handle is provided at 55 for remote operation of the handle unit 46 by means of, for example, a cable. Thus, rotation of the handle causes rotation of the barrel 32.

The barrel 32 has an internally threaded portion at its end adjacent the guide 36; however, the thread is interrupted such that two threaded portions forming 80° sections are located 180° apart. A bolt 40 having its opposed sides faced off, has male keys 43 cut on the faced off sides such that it is arranged to slide in keyways 39 in the guide ring 36 and has 80° sections, 180° apart, threaded along the length of the bolt. A pair of nuts 74 are provided upon the end of the bolt 40 and secured therebetween is a guide assembly 66 which comprises an end flange 68 and a tube portion 60 adapted to slide over the barrel housing 24. A spring 72 extends from the flange 26 of the barrel housing 24 to the flange 68 of the guide unit 66 to exert a pressure thereon to a direction toward the right as illustrated in FIGURE 1.

An internal bore 54 is provided in the bolt 40 to allow for pasagweay of the cable therethrough. A retainer 56 is pressed on and locked with a reduced portion 41 of the bolt 40 and provides a stop means for abutting against the internal shoulder 64 of the barrel 32. A cable 70 which extends through the cable guide 18, the end plate 14 and the bolt 40 has a ball end 62 swaged on the cable while the other end is attached to a piece of equipment such as a portion of an astronaut's restraint system.

When the device is used for restraint, the astronaut would be placed in his seat with the cable 70 attached to a part of his suit and the lever unit 46 is moved to cause rotation of the barrel 32 to cause disengagement of the interrupted thread. The cable is tightened against the action of the spring 72 which exerts its pressure on the flange 68 of the guide unit 66 until a predetermined desired restraint force is achieved. The cable is then secured to the restraint system. A further pull on the cable will allow freedom from restraint and the handle unit is locked in position to engage the interrupted threads of the barrel to the bolt. Since a 16 pitch thread may be utilized, adjustment may be made in 1/16 increments. Release of the lever 52, for example by pulling a cable attached at 55, will then cause movement of the bolt to apply the predetermined amount of tension on the cable or restraint on an astronaut or pilot restraint systems.

Although the invention has been described with reference to a particular embodiment, it will be understood to those skilled in the art that the invention is capable of a variety of alternative embodiments within the spirit and scope of the appended claims.

I claim:
1. A device for tensioning a cable comprising
   a bracket for securing said device to a fixed object,
   a hollow cylinder fixedly mounted on said bracket,
   a hollow barrel concentrically mounted for rotation within said cylinder, said barrel having radial segments of an interrupted thread on the internal surface thereof,
   a hollow bolt having interrupted threads on the outer surface thereof to mate with said barrel such that when said threads are in engagement, said bolt is locked against axial movement and when said threads are disengaged, said bolt is free for axial movement,
   means mounted on said barrel for causing rotation thereof with respect to said cylinder to engage and disengage the interrupted threads on said barrel and bolt,
   spring biased means secured to said bolt for applying a force thereto to cause movement of said bolt in an axial direction when said threads are disengaged,
   cable means extending through said bolt, and
   means on said cable for engagement with said bolt for transmitting the force applied to said bolt to said cable when said threads are not in engagement.

2. A device as defined in claim 1 wherein said interrupted thread comprises a pair of 80° segments 180° apart.

3. A device as defined in claim 1 including stop means on said bolt for limiting axial movement thereof to a predetermined length.

4. A device as defined in claim 1 including means for inhibiting rotation of said bolt.

References Cited by the Examiner
UNITED STATES PATENTS

| | | | |
|---|---|---|---|
| 2,597,403 | 5/1952 | Tedesco | 81—159 |
| 2,865,600 | 12/1958 | Roebling | 24—68 X |
| 2,866,244 | 12/1958 | Cobin | 24—68 |
| 3,065,007 | 11/1962 | Colmer | 254—67 X |

WILLIAM FELDMAN, *Primary Examiner.*

MILTON S. MEHR, *Examiner.*